Oct. 22, 1963 W. J. S. JOHNSON ETAL 3,107,932
SINGLE SCREW LOCK CONNECTION FOR STRUCTURAL MEMBERS
Filed Jan. 29, 1962 2 Sheets-Sheet 1
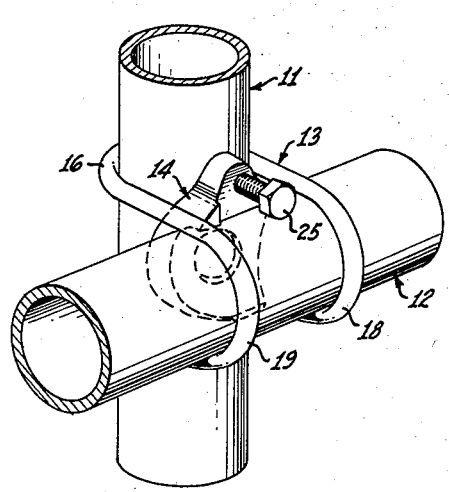
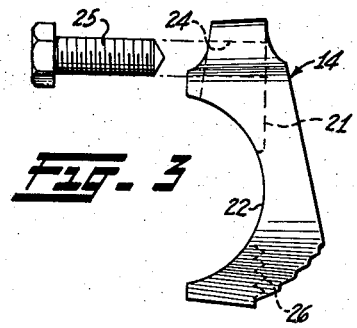
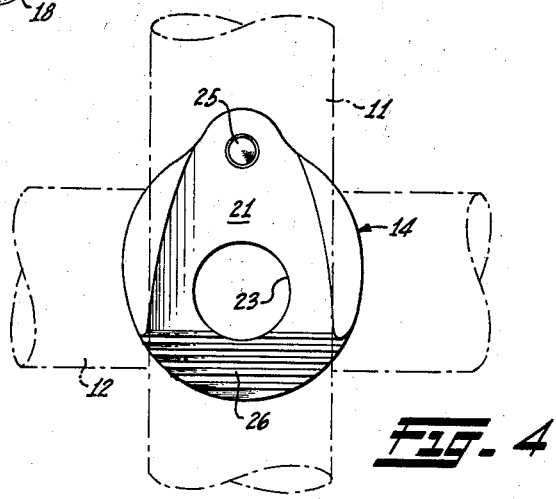
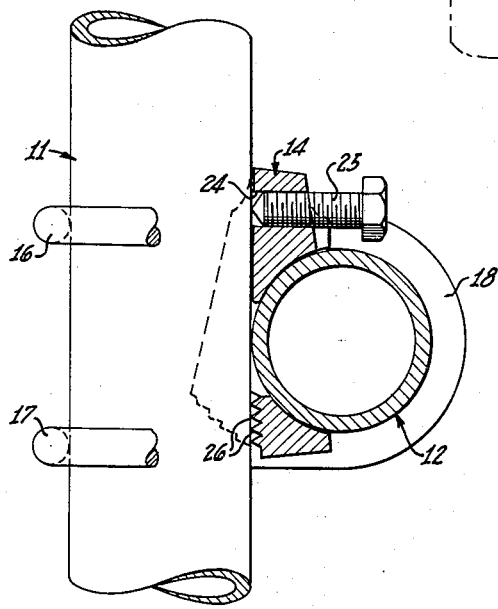
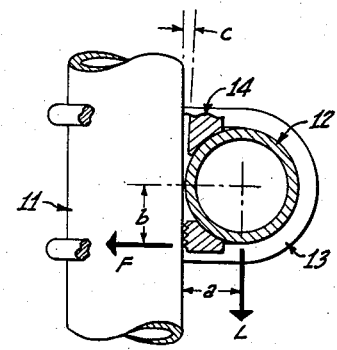
INVENTORS:
WALLACE J. S. JOHNSON
ROBERT E. FISHER
ARCHIE JOHN McEWING
By Mellin and Hanscom
ATTORNEYS Oct. 22, 1963 W. J. S. JOHNSON ETAL 3,107,932
SINGLE SCREW LOCK CONNECTION FOR STRUCTURAL MEMBERS
Filed Jan. 29, 1962 2 Sheets-Sheet 2

INVENTORS:
WALLACE J. S. JOHNSON
ROBERT E. FISHER
ARCHIE JOHN McEWING
By Mellin and Hanscom
ATTORNEYS United States Patent Office 3,107,932
Patented Oct. 22, 1963

3,107,932
SINGLE SCREW LOCK CONNECTION FOR STRUCTURAL MEMBERS
Wallace J. S. Johnson and Robert E. Fisher, Berkeley, and Archie John McEwing, Concord, Calif., assignors to Up-Right, Inc., Berkeley, Calif., a corporation of California
Filed Jan. 29, 1962, Ser. No. 169,520
14 Claims. (Cl. 287—54)

This invention relates to structural members such as tubes and more particularly to means for connecting such members when laid against each other.

In general the object of this invention is to provide means for connecting structural members such as are used in scaffolding or storage racks wherein vertical column tubes have horizontal beam tubes connected thereto. The column tubes are generally fixed insofar as their position is concerned, and the beam tubes are connected thereto at desired heights. The beam tubes are then used to support platforms, personnel, pallet loads of goods, and so forth. It is, of course, essential that the beam tubes be prevented from slipping down on the column tubes when loads are applied.

A further object of the invention is to provide a connection for structural members in which only a single screw is used to clamp the members together.

Another important object of the invention is to provide a connection for structural members, which has a locking action to prevent slippage of the connected members, and in which the locking action increases in magnitude as the load that would otherwise cause slippage increases.

Yet another object of the invention is to provide a connection for structural members, as for example column and beam members, in which the beam member can be connected to the column member without disturbing either the position of the column member or sliding the connector along the column member.

A still further object of the invention is to provide a lock connection for structural members which is inexpensive to manufacture, has a minimum of parts, and is easy for relatively unskilled workmen to use.

Other objects and advantages will become apparent in the course of the following detailed description.

Referring now to the drawings, wherein is shown a preferred form of the invention and wherein like parts are designated by like reference numerals throughout the same, FIG. 1 is a perspective view of a connection for tubular members as constructed in accordance with the invention.

FIG. 2 is an elevational view, partly in section and with parts broken away for the purpose of clarity, of the invention shown in FIG. 1.

FIG. 3 is a side view of the saddle used in the invention.

FIG. 4 is a front view of the saddle of the invention with the tubular members received therein being shown in phantom.

FIG. 5 is a diagrammatic view of the connection illustrating the moment forces involved during loading.

Figure 6:
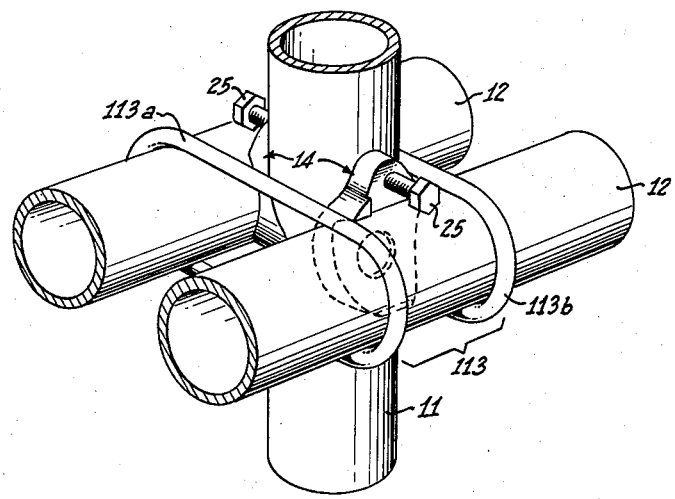
FIG. 6 is a perspective view of three tubular members connected in accordance with the invention.

The connection, best seen in FIG. 1, as used to connect two tubular structural members 11 and 12 laid against each other, comprises a loop means 13 and a saddle member 14. The particular loop means illustrated is formed by joining the ends of a round steel rod, as by welding, and shaping the loop into an elongated loop having ends 16 and 17 conforming to the outer surface of tube 11, said loop being doubled back upon itself intermediate said ends at 18 and 19 to conform to the outer surface of tube 12. When the loop 13 is disposed around the tube, as shown in FIGS. 1, 3 and 5, it prevents movement of the tubes away from each other.

The saddle member 14 has two channels 21 and 22 formed thereon conforming to the outer surfaces of tubes 11 and 12, respectively, the channels being formed on opposite sides of the body of the saddle member. As is best seen in FIGS. 2 and 4, the roots of the channels 21 and 22 intersect, thus forming a circular hole 23 through the saddle, enabling the saddle to be disposed between the tubes 11 and 12 while at the same time allowing the tubes 11 and 12 to touch one another.

The saddle is provided with a threaded hole 24 extending into one end of channel 21 for the reception of screw 25. The other end of chanel 21 is provided with a number of grooves which form relatively sharp edges 26 transversely to the channel.

As previously mentioned, the described connection finds particular use in connecting horizontal beam tubes 11 to vertical column tubes 12 such as are used in scaffolding, storage racks and the like. In assembling the connection, the loop means 13 is first positioned on column tube 11 by moving the loop midportions 18 and 19 by opposite sides of tube 11 so that the loop ends 16 and 17 engage tube 11. This has an important advantage in that the column tube 11, which is generally fixed in position, is completely undisturbed as the connection is made. The saddle member 14 is then positioned inside loop 13, as shown in FIGS. 1 and 2, so that the saddle channel 21 receives tube 11 therein. The beam tube 12 is then inserted lengthwise into the generally circular opening formed by saddle channel 22 and the loop portions 18 and 19.

It is, of course, to be realized that the beam tube 12 can be connected to as many column tubes as desired. In such case, a loop means 13 and saddle member 14 will be used for each connection, with the beam tube 12 being inserted progressively through all of the loop means 13.

After positioning the beam and column tubes as above described, the saddle is canted by tightening the single screw 25 to force the upper end of saddle channel 21 away from tube 11, thus forcing both tubes tightly against the loop means which encircles them. It will be noted that in tightening screw 25 the force of this screw against column tube 11 causes the saddle to urge beam tube 12 against loop portions 18 and 19 with approximately double this amount of force. Also, the lower, grooved end of channel 21 of the saddle is forced into biting engagement with column tube 11 with a force approximately equal to that exerted by screw 25 on tube 11.

FIG. 5 illustrates the principle whereby the locking effect of the present connection increases as load is applied to the beam tube 12. When in use as scaffolding, shelving or the like, the beam tubes 12 will support platforms or other loads laid thereon, which loads will exert a downward force L, acting vertically through the axis of tube 12. In conventional tube connections, the clamps provide only a frictional connection or clamping action, with slippage being prevented only by the magnitude of the squeeze of the clamp or by the digging in of a set of screws. These clamping forces remain essentially constant as the load varies, with the result that if the load becomes too great it will overcome the frictional clamping force of the connection and the beam tube will slip downwardly.

The present invention also uses the frictional engagement of the connecting elements to prevent slippage, but, in addition, utilizes the locking effect realized by the independently movable saddle disposed between the tubes. As seen in FIG. 5, the load L causes a moment $aL$ to be applied to the connection which is opposed by moment $bF$. This latter moment causes the relatively sharp edge at the bottom of saddle channel 21 to bite into column tube 11 with a force F. Since the distances *a* and *b* are constant, it is apparent that the biting or locking force F will increase in direct proportion to an increase in load L. Thus, because the tubes are offset and the saddle is independent of the tubes, the saddle will tilt a small arcuate amount *c* with the beam tube as the loop 13 stretches under load and the lower edge of the saddle will bite into the column tube with greater and greater grip as the load increases.

Tests which have been conducted indicate that the load carrying capacity of the above described connection is substantially increased by the action of the locking force F, since slippage is not resisted solely by the friction between the tubes and loop means. These tests indicate that the beam tube can take almost as much load without slippage as will cause column failure by buckling.

Although in FIG. 5 the saddle 14 is shown as substantially canted from the column tube 11, it should be realized that such canting has been exaggerated for purposes of illustration. Actually, as the load on the beam tube is increased, the resulting elongation of the loop will be generally imperceptible to the eye.

To disassemble the connection, the screw 25 is merely loosened. The beam tube is withdrawn, and the saddle and loop are removed from the column tube. Thus, in assembling or disassembling the connection only a single screw need be tightened or loosened.

Although the loop means 13 is formed from a circular rod, it is of course to be realized that it could also be square or rectangular in cross section if desired, as long as the loop encircles both tubes to restrain their movement apart. Furthermore, if desired, the inner surfaces of the loop may be roughened where the loop engages the tubes to increase the frictional engagement therebetween.

The beam and column tubes, although shown as tubular and circular in cross section, need not be so shaped. For example, the members 11 and 12 could be solid and/or polygonal in section, if desired. They may also be I-beam, channels, or the like, if desired. Of course, if the members 11 and 12 were non-circular, it would be preferable if the loop means and the saddle channels were shaped in conformity thereto so that the maximum frictional resistance is obtained and so that deformation of the loop means will be minimized.

Furthermore, the saddle can have more or less than the number of sharp edges 26 formed on channel 21 as desired. The locking effect is achieved primarily by the lowermost edge 26 with the next succeeding edges having a decreasing effectiveness. However, to achieve the locking effect possible with the present invention, it is necessary that the saddle be provided with at least one biting edge at the lower end of channel 21. If the lower end of this channel were merely rounded, then slippage would be resisted only by the friction between the elements rather than in combination with the above described biting effect.

Again, the connection has been illustrated for use with horizontal and vertical tubes disposed at right angles to one another. If desired, the tubes could be diagonally arranged. Further, the tubes could be laid together at some angle other than 90°. In such case, however, the saddle 14 would have to be provided with channels 21 and 22 disposed at a corresponding angle, and the loop means would have to be twisted to accommodate the different angular disposition of the tubes. In any event, the cooperation of the elements would remain the same, with the tightening of the single screw causing the saddle to be canted so that the tubes are pressed apart into tight engagement with the loop means encircling the tubes.

The principles described above can also be applied to securing two beam tubes to a column tube, with one beam tube being on either side of the column tube, as shown in FIG. 6. A saddle 14 is positioned between the column tube 11 and each beam tube 12, and loop means 113 again extends around the tubes to prevent their movement away from each other as the saddle screws 25 are tightened. In this instance, the loop means 113 consists of two identical endless loops 113a and 113b each of which passes around both beam tubes, with the two loops being on opposite sides of the column tube. When the tubes are connected as shown in FIG. 6 and the screws 25 are tightened, the connection will have the same locking effect as described previously in connection with FIG. 5.

If desired, the connection of FIG. 6 can be varied within the scope of the invention by the tightening of only one saddle screw 25 instead of both, or even by omitting one saddle. In each instance, the connection will have the same locking effect, with the effectiveness of the connection being only expectably different from that described herein.

Although only one embodiment of the invention has been illustrated, it is apparent from the above that many changes may be made in the shape, size, and arrangement of parts, without departing from the spirit of the invention or the scope of the appended claims.

Having thus described our invention, what we claim and desire to secure by Letters Patent is:

1. Structure of the character described comprising at least two structural members each laid angularly adjacent another, loop means passing around said members to limit movement of said members apart from each other, a saddle disposed between said adjacent members and having channels formed thereon conforming to and receiving said members therein, and means for canting said saddle relative to one of said members by forcing one end of a channel away from the member received within said channel.

2. Structure of the character described comprising at least two structural members each laid angularly adjacent another, loop means passing around said members to limit movement of said members apart from each other, a saddle disposed between said adjacent members and having channels thereon conforming to and receiving said members therein, and a screw member threaded through said saddle and extending into one end of one of said channels, said last named channel having at least one relatively sharp edge formed at its other end for biting engagement with the member received therein.

3. Structure of the character described comprising three structural members each laid angularly adjacent another, loop means passing around said members to limit movement of said members apart from each other, means disposed between said adjacent members for forcing said members apart to the limit permitted by said loop means.

4. Structure of the character described comprising three structural members each laid angularly adjacent another, loop means passing around said members to limit movement of said members apart from each other, a saddle disposed between said adjacent members and having channels formed thereon conforming to and receiving said members therein, and means for canting said saddle relative to one of said members by forcing one end of a channel away from the member received within said channel.

5. Structure of the character described comprising three structural members each laid angularly adjacent another, loop means passing around said members to limit movement of said members apart from each other, a saddle disposed between said adjacent members and having channels thereon conforming to and receiving said members therein, and a screw member threaded through said saddle and extending into one end of one of said channels, said last named channel having at least one relatively sharp edge formed at its other end for biting engagement with the member received therein.

6. Structure of the character described comprising: first and second structural members laid angularly against each other, loop means passing around said members to limit movement of said members away from each other, a saddle disposed between said members and having channels formed thereon conforming to and receiving said members therein, means for canting said saddle relative to one of said members by forcing one end of a channel away from the member received within said channel.

7. The structure as set forth in claim 6 wherein said loop means comprises an endless elongated loop having end portions conforming to the surface of one of said frame members, said loop being doubled back upon itself intermediate said ends to conform to the surface of the other of said members.

8. The structure as set forth in claim 6 wherein the last named channel has at least one relatively sharp edge formed at its other end for biting engagement with the outer surface of the frame member received therein when said saddle is canted.

9. Structure of the character described comprising: column and beam members laid at right angles against each other, loop means passing around said members to limit movement of said members away from each other, a saddle disposed between said members and having channels formed thereon conforming to and receiving said members therein, a screw member threaded through said saddle and extending into one end of the channel receiving said column member, said last named channel having at least one relatively sharp edge formed at its other end for biting engagement with said column member.

10. Structure as set forth in claim 9, wherein said loop means comprises an endless elongated loop having end portions conforming to the surface of said column member, said loop being doubled back upon itself intermediate said ends to conform to the surface of said beam member.

11. A lock for clamping structural members laid against each other at an angle therebetween comprising: a loop means adapted to pass around said members to limit movement of said members away from each other, a saddle disposable between said members where held by said loop means, said saddle having channels formed thereon conforming to and adapted to receive said members therein, and a screw member threaded through said saddle and extending into one end of one of said channels.

12. A lock for clamping structural members laid against each other at an angle therebetween comprising: an endless elongated loop having end portions conforming to the surface of one of said members, said loop being doubled back upon itself intermediate said ends to conform to the surface of the other of said members, said loop being disposable around said members to limit movement of said members away from each other, a saddle disposable between said members where held by said loop, said saddle having channels formed theron conforming to and adapted to receive said members therein, and a screw member threaded through said saddle and extending into one end of one of said channels, said last named channel having at least one relatively sharp edge formed at the other end thereof for biting engagement with the member receivable within said channel.

13. A saddle for use in connecting two structural members together, comprising a body having channels formed on opposite sides thereof, said channels being angularly disposed relative to each other and of a shape conforming to the outer surfaces of said structural members, and an adjustable screw member threaded through said saddle in a direction substantially normal to the axis of both channels and extending into one end of one of said channels.

14. The saddle as set forth in claim 13 wherein said one channel has at least one relatively sharp edge formed at its other end for biting engagement with any structural member disposed within that channel.

References Cited in the file of this patent

UNITED STATES PATENTS

| 579,238 | Littlefield | Mar. 23, 1897 |
| 2,101,317 | Lemieux | Dec. 7, 1937 |
| 2,584,614 | Rasmussen et al. | Feb. 5, 1952 |

FOREIGN PATENTS

| 417,366 | Italy | Jan. 18, 1947 |